United States Patent Office 3,492,063
Patented Jan. 27, 1970

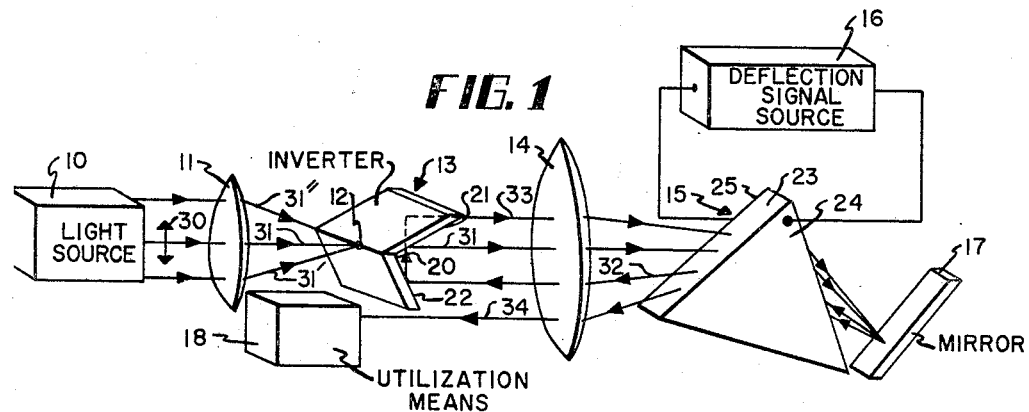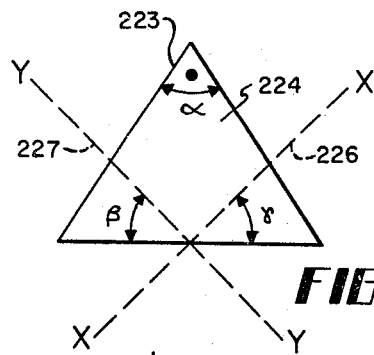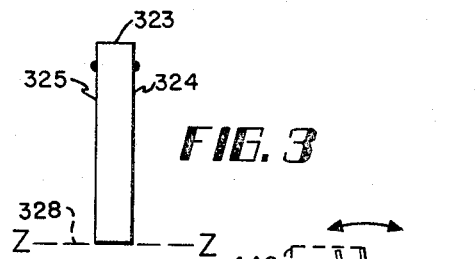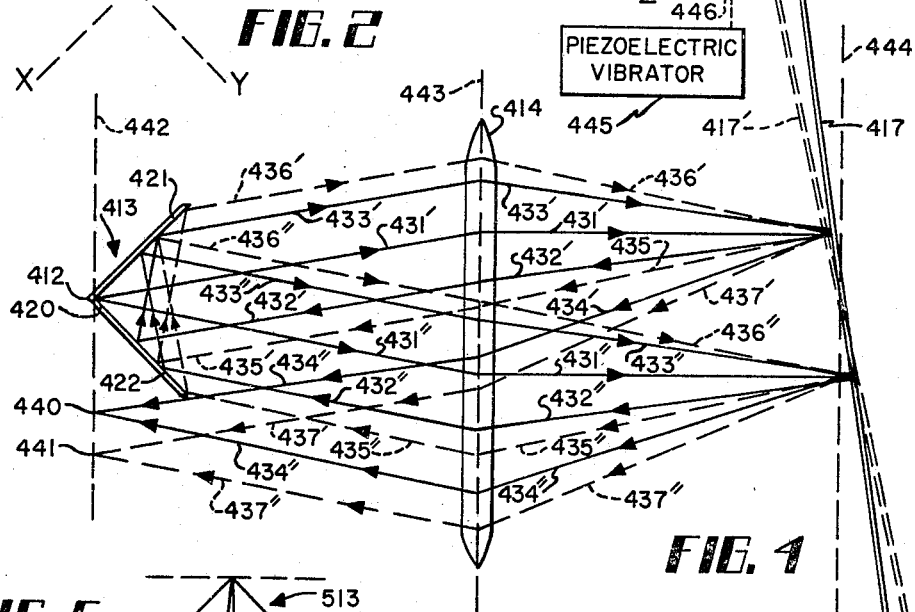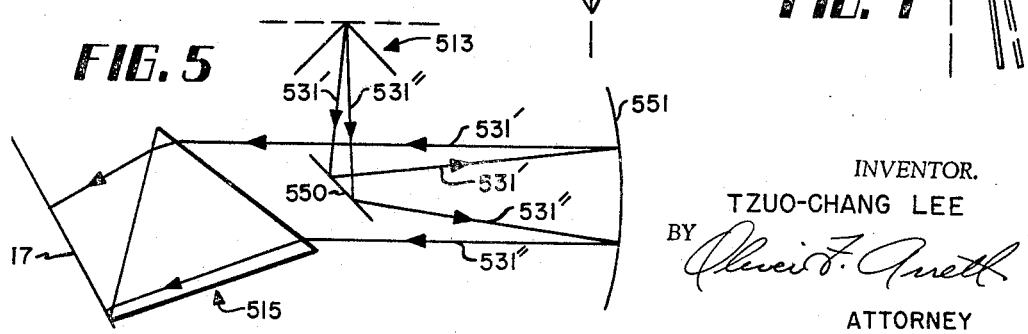
INVENTOR.
TZUO-CHANG LEE
ATTORNEY

3,492,063
MULTIPLE PASSAGE LIGHT BEAM
DEFLECTION SYSTEM
Tzuo-Chang Lee, St. Louis Park, Minn., assignor to Honeywell Inc., Minneapolis, Minn., a corporation of Delaware
Filed Nov. 14, 1966, Ser. No. 593,975
Int. Cl. G02f 1/28
U.S. Cl. 350—160                                        8 Claims

ABSTRACT OF THE DISCLOSURE

In a system for providing deflection of a light beam, a mirror, operating in conjunction with strategically positioned optical lenses and a beam inverter, redirects an incident light beam through substantially the same volume electro-optical material a plurality of times so as to provide cumulative deflection. An alternative embodiment in which a movable reflective surface replaces the electro-optical deflector is also described.

---

The invention is directed to a system for controlling light beams; and, more particularly, to a system for deflecting light beams.

In this specification, the term "light" is used to mean electromagnetic waves within the band frequencies including infrared, visible and ultraviolet light.

In a preferred embodiment, deflection is obtained at high frequencies by means of an electro-optical (E-O) material. Materials exhibiting the E-O effect change in refractive index when an electric field is applied. It is known that such materials may be used to deflect light beams. Drawbacks of prior art light beam deflectors utilizing E-O material are that the deflection obtained in one passage through a prism of E-O material is extremely small and the voltage required to obtain significant beam deflection is relatively high. Such high voltages often make power dissipation a problem in operating devices. In addition, very high quality E-O crystals are expensive and make use of such prior art structures impractical.

The present invention provides an improved system which overcomes a variety of prior art drawbacks. In the preferred embodiment, light beam deflection is achieved by multiple passes of the beam path through substantially the same volume of E-O material. The multiple passage is obtained by strategic placement of means for converting a parallel path to a converging path and for converting a diverging path to a parallel path, reflecting means for redirecting an incident parallel path through the E-O medium, and means for inverting an incident converging beam from the converting means to a diverging beam directed back at the converting means. The preferred embodiment of the invention also allows a light beam of relatively large width to be passed through an E-O deflector many times without substantially increasing the volume of E-O material required, without making a large spatial separation necessary between reflectors in the system, and without making the reflector sizes unreasonably large.

Many materials are known to exhibit the E-O effect. Among those are solids like potassium dihydrogen phosphate (KDP) and potassium niobium tantalate (KTN) and liquids like nitrobenzene. If a material like KDP is used for the E-O prisms, the crystal may be cut so that an electric field may be applied along the C-axis of the crystal. Deflection then occurs when a properly polarized light beam traverses a prism having nonparallel entrance and exit faces. The deflection is varied in an analog manner when the applied voltage is so varied. It is known that the deflection achievable in a single pass through such a prism is limited by the E-O coefficients and other effects caused by high voltage application.

The number of resolvable spots obtainable in an E-O light deflector is given by the equation $$N_r = \frac{\Delta m}{\dfrac{\lambda}{D}}$$

where $\Delta_m$ is the total deflection angle, $\lambda$ is the wave length of the light, and $D$ is the diameter of the beam. The deflection angle ($\Delta_m$) is determined by the difference in optical path lengths for opposite extremities of the beam passing through the E-O material and is approximately $\Delta nL/D$ for small angles, where $\Delta_n$ is the change in refractive index for the ray of interest and $L$ is the path length difference in E-O material between the two extremities of the beam. The number of resolvable spots can therefore be written as:

$$N_r \cong \frac{\Delta nL}{\lambda}$$

Prior art devices have increased the deflection by passing the beam through successive crystals in a manner such that the path length differences contributed by each crystal are cumulative.

The preferred embodiment of the invention utilizes the strategic placement of reflective surfaces and converting means to redirect a path for a light beam through substantially the same volume of E-O crystal, as that traversed during the first pass, a plurality of times in such a manner that the optical path length differences resulting from each pass are cumulative. An increase in the number of resolvable spots is obtained without utilizing substantial additional E-O material. That advantage is important since the E-O material is normally the most expensive part of such a system. Additionally, the use of a converter, such as a lens, and an inverting reflector allows the light beam to have a relatively large diameter while passing through the E-O material so that the path length difference between its opposite extremities is large and yet to be focused soon after leaving the E-O material so that the inverter may be placed a relatively short distance away from the E-O material without reducing the entrance aperture, and therefore the usable beam diameter.

Further features of the invention and its various embodiments may be determined from the following detailed description and drawings wherein:

FIGURE 1 is a block diagram perspective view of a preferred light deflection system utilizing an E-O crystal in accordance with the invention; FIGURE 2 is a side view of the E-O crystal shown in FIGURE 1; FIGURE 3 is a front view of the E-O crystal shown in FIGURES 1 and 2; FIGURE 4 is a ray tracing diagram illustrating a second embodiment of the invention and FIGURE 5 is a schematic diagram of a modified light deflection system similar to that of FIGURE 1, utilizing the invention. Corresponding parts of various figures have been numbered with corresponding numbers prefixed by different numbers in the 100's digit.

The system of FIGURE 1 includes a monochromatic light source 10 such as a laser, which directs a beam of light through a lens 11, an aperture 12 in an inverting means, generally designated 13, and a converting means, here shown as a lens 14, to a deflector generally designated 15. Inverting means 13 is here shown as a pair of reflective surfaces 21 and 22 intersecting at right angles to one another along a common line 20. Lens 14 is designed so that it converts a diverging beam impinging from the direction of inverting means 13 to a parallel beam and converts a parallel beam impinging from the opposite direction to a converging beam directed at inverting means 13. The amount of deflection imparted to the beam by deflector 15 is controlled by control signal means, such as deflection signal source 16. In operation, light source 10 emits a beam of light linearly polarized in the vertical direction as shown by double headed arrow 30. The figure shows a center ray 31, a top ray 31" and a bottom ray 31' of the emitted beam before it enters the deflection portion of the system. The beam is focused by lens 11 at the aperture 12. FIGURE 1 shows only the center ray of the beam in the deflection portion of the system to avoid confusion. The top and bottom rays of the beam after its entry into the deflection portion are shown in FIGURE 4 and will be discussed in detail hereinbelow. Referring again to FIGURE 1, ray 31 proceeds from the center of inverter 13 through lens 14 and deflector 15 to reflective surface 17. As can be seen, a converging beam impinging upon inverter 13 is inverted to a diverging beam emanating from inverter 13 at a conjugate position displaced from that of both the originally transmitted beam and the incoming converging beam. Surface 17 is positioned so that ray 31 strikes it at a small angle to the normal to the surface. From surface 17, the ray is reflected back as ray 32 through deflector 15 and lens 14 to inverter 13, which reflects the ray to its conjugate point on the opposite side of line of intersection 20. The reflected ray 33 is returned through the lens 14 and deflector 15 to reflective surface 17 again. The beam impinges upon reflective surface 17 at a greater angle to the normal than it did in its first impingement, and is therefore reflected back through deflector 15 in a different direction. Ray 34 then traverses lens 14 and impinges upon the surface of utilization means 18. This process can continue a plurality of times until light eventually is allowed to impinge upon utilization means 18.

Light source 10 may be any source of infrared, visible or ultraviolet radiation, but is preferably a highly monochromatic, coherent source such as a helium-neon gas laser so the light beam can be intense and well focused. The beam emitted from source 10 should also be polarized. If KDP is used in the deflector 15, the proper polarization directions are indicated by a double headed arrow 30. If necessary any of a number of well known polarizing means may be included in source 10 for achieving such a polarized output. Lens 11 may be either a circular lens or a cylindrical lens depending upon the beam shape desired. Lens 11 is constructed and positioned so that it focuses the beam from source 10 in aperture 12 with the focal point lying on line of intersection line 20. Inverter 13 is positioned so that the line of intersection 20 is perpendicular to the direction of the beam deflection and to the direction of propagation of the light beam from source 10. Lens 14 can be an ordinary high quality lens, and should have as large a field as possible. Reflective surface 17 may be a high quality plane mirror; and utilization means 18 may be a display device, an optical memory, or any other device for utilizing a deflected light beam.

Detailed construction of E–O deflector 15 can be seen from FIGURES 1, 2 and 3. Deflector 15 can be a triangular crystal of E–O material 23 which has a pair of substantially parallel end faces coated by electrodes 24 and 25. If light source 10 is a helium-neon laser emitting at 6328 A., a satisfactory deflector can be constructed from KDP or ammonium dihydrogen phosphate (ADP) with the crystal cut in the form of an isosceles triangular prism with the X crystalline axis 226 making an angle $\gamma$ of approximately 45° with the base of the triangle, and the Y crystalline axis 227 making an angle $\beta$ of approximately 45° with the base of the triangle. The apex angle $\alpha$ of the triangle, for those materials, is preferably about 67°. As shown in FIGURE 3, the Z crystalline axis 328 is perpendicular to the parallel triangular faces. The apex angle $\alpha$ is chosen so that, in the minimum deviation configuration, the entrance and exit faces present Brewster angles to light polarized in the plane of incidence. Reflection loss is thus kept at a minimum. The crystalline X and Y axes are such that when an electric field is applied through electrodes 24 and 25, the axes for the light polarizations in the X–Y plane are along the height and base of the prism triangle, respectively. The change of refractive index for light polarized along the height is given by $\Delta_n = \frac{1}{2} N_o^3 R_{63} E_z$, where $N_o$ is the ordinary refractive index, $R_{63}$ is the E–O coefficient, and $E_z$ is the electric field along the crystalline Z axis. Additionally, the entrance and exit faces of the prism may be coated with antireflective material to further reduce reflections if desired.

The light deflection system of FIGURE 4 is basically the same as that of FIGURE 1 in that it includes an inverting means, generally designated as 413, a converting means, shown as lens 414, and a deflector means 417. However, in this embodiment, the deflector means is shown as a planar reflective surface or mirror 417. That is, the E–O crystal deflector is excluded in this embodiment and deflector means 417 includes a piezoelectric vibrating means 445 and linking means 446 connecting vibrator 445 to mirror 417. Such vibrating mirror arrangements are well known in the art and may be used to deflect the light beams to achieve the same effect that the E–O crystal achieves. However, deflection does not occur readily at such high frequencies as when an E–O deflector is used.

The operation of the deflection portion of both embodiments will be described in detail with reference to FIGURE 4 since the behavior of the radiation is the same in both embodiments. A dashed line 443 represents the plane of the axis of lens 414. To achieve optimum operation from the system, the line of intersection 420 on the inverter should lie in a first focal plane indicated by dashed line 442, on one side of lens 414, and reflective surface 417 should intersect a second focal plane, indicated by dashed line 444, on the opposite side of lens 414. Reflective surface 417 should intersect focal plane 444 along a line through the point where the center rays of the beam impinge upon reflective surface 417. When an E–O crystal is used as the deflector, reflective surface 417 is tipped at a small angle to focal plane 444 so that the incoming beam strikes at a slight angle to the normal after a first traversal through the E–O crystal.

As the light beam enters the deflection portion of the system through aperture 412, it appear as if the light is emanating from a point source on intersection line 420 in focal plane 442. The diverging beam emanating from that point source is shown by top ray 431' and bottom ray 431". These rays diverge until they strike lens axis plane 443. Lens 414 converts the diverging beam to a parallel beam as shown by rays 431' and 431" to the right of the plane 443. The parallel beam represented by these top and bottom rays continues, passing through a predetermined volume of the E–O crystal, when it is used as a deflector, until it strikes reflective surface 417. At that point, it has impinged at a slight angle to the normal and is reflected off at an angle equal to the angle of incidence as a beam with a top ray 432' and a bottom ray 432". The beam then traverses a volume of the E–O crystal which is substantially superimposed upon the predetermined volume. When the beam strikes axis plane 443, lens 414 converts the parallel beam impinging from the right to a beam converging toward a focal point, on focal plane 442, which is offset from the center of inverter 413. The beam converges until it strikes mirror surface 422 of inverter 413. When rays 432' and 432" are intercepted by surface 422, they are reflected upward and focused at a point halfway between reflective surface 422 and surface 421. From that focal point, the beam diverges until it strikes reflective surface 421 where it is reflected back toward lens axis plane 443 as top ray 433' and bottom ray 433". Inverter 413 inverts the left and right sides of the beam and inverts the beam from a converging beam to a diverging beam, but it does not invert the top and bottom rays of the beam. Therefore, as the beam returns through the system, the top ray remains on top and the path length changes imparted by the E–O crystal in successive passes are cumulative. The diverging beam represented by top ray 433' and bottom ray 433" is again intercepted by lens 414 and converted to a parallel beam which strikes reflective surface 417 at an angle of incidence greater than that at which impinging rays 431' and 431" struck. Therefore, the reflected beam with top ray 434' and bottom ray 434" is at a greater angle to the normal than the beam represented by top ray 432' and bottom ray 432". That parallel beam again is intercepted by lens 414 and converted to a converging beam at axis plane 433. The converging beam does not strike inverter 413 and therefore is focused at a point of 440 on focal plane 442. The utilization means (not shown in FIGURE 4) is normally positioned with a light sensitive surface near or on focal plane 442. However, extra optics can be employed to bring the deflected beam to a more convenient location for the utilization means.

Beam deflection is obtained in the embodiment of FIGURE 1 when deflection signal source 16 applies a potential between electrodes 24 and 25, thereby creating an electric field in E–O crystal 23. The electric field causes E–O crystal 23 to change its refractive index for light passing through it. It can be shown that application of an electric field to the E–O crystal has the same effect as increasing the angle of tilt between mirror 417 and focal plane 444. Therefore, the position of mirror surface 417, shown by dotted position 417', is the equivalent of using an E–O deflector with the maximum applied field. The tilting of surface 417 shortens the optical path for the top ray of the beam and lengthens the path for the bottom ray. The path length difference is the same as that obtainable by application of the electric field to E–O deflector 15. Therefore, when a deflection signal is applied to deflector 15, it has the same effect as if mirror surface 417 were rotated to a position such as that shown by dotted position 417' by vibrator means 445. If position 417' represents the path difference achievable by the maximum deflection signal, mirror surface 417 can effectively lie at any angle between that shown by position 417 and that shown by position 417'. The beam emanating from the light source enters the system and continues until it strikes the mirror surface at position 417'. Since the angle of tilt has been increased, the angle of incidence has also been increased so that the angle of reflection is increased. The reflected beam is shown by dotted top ray 435' and bottom ray 435". This beam continues through the system in the same manner as the undeflected beam but strikes inverter 413 at a position offset from that at which the undeflected beam strikes. It is therefore reflected back as a beam shown by top ray 436' and bottom ray 436" in a position offset from that of the undeflected beam and strikes reflective surface 417' at an even greater angle. From that surface, it is reflected as a beam, shown by a top ray 437' and a bottom ray 437", which is ultimately focused at a point 441 on focal plane 442.

In either embodiment, it can therefore be seen that a light beam can be focused in a number of resolvable spots along focal plane 442 between point 440 and point 441. For simplicity, the system has been described showing only one reflection back into inverter 413. With the preferred embodiment, the system is ordinarily designed so that the beam is reflected into inverter 413 several times, thereby achieving a large number of traverses through the E–O crystal. The deflection system must be arranged so that the light beam is intercepted by the inverter means in both the deflected and undeflected states on the next to the last round trip through the system and is not intercepted on the last round trip for either the deflected or undeflected state. This design criterion is met by careful design of the system parameters.

The preferred embodiment of the deflection system utilizing an E–O crystal deflector has several advantages. First, the combination of lens 14 and inverter 13 allows numerous passes through the E-O material to be achieved without requiring large distances between deflector 15 and the reflective surfaces while the beam diameter in deflector 15 is maintained at a reasonable size. Also, efficient use of E–O crystal 13 is made when the reflective surface 17 and inverter 13 are positioned as shown near the focal planes of lens 14. When E–O crystal 23 is placed with its exit face very close to, or in contact with, reflective surface 17 (such positioning can be achieved by placing a compensating prism in contact with the entrance face of the E–O crystal), it can readily be seen that very little additional E-O material is needed over that required for a single pass. The beam is always centered at the same spot on the focal plane of the reflector; only its angle of incidence is changed.

Therefore, an active volume can be defined in E–O crystal 23 as that within the outer limits of the volumes traversable by a path for the light beam during the penultimate and ultimate traverses therethrough. With the deflections shown in FIGURE 4 assumed to be the maximum achievable in a single pass through crystal 23, the active volume is that bounded by the crystal faces carrying electrodes 24 and 25, the entrance and exit faces of crystal 23, and the planes, perpendicular to the crystal faces carrying electrodes 24 and 25, which contain rays 436' and 437".

FIGURE 5 is a schematic showing of an alternative deflection system to that of FIGURE 1. A plane mirror 550 and a spherical mirror 551 together perform the same function as that performed by lens 14 in FIGURE 1. That is, mirrors 550 and 551 cause a diverging beam from inverter 513 to be converted into a parallel beam directed at deflector 515 and cause a parallel returning beam from deflector 515 to be converted to a converging beam directed at inverter 513. In all other respects, the deflection system shown in FIGURE 5 operates identical with that of FIGURE 1.

In deflectors utilizing the invention, increasing the beam width increases the number of resolvable spots. Also, the number of resolvable spots can be increased more easily by increasing the field of the lens than by increasing its focal length. The number of round trips usable in the system is inversely proportional to the focal length of the lens but it is an insensitive function of the other system parameters; therefore, for a given focal length, the upper frequency limit of deflection is relatively constant, ranging from 1 mHz. to 10 mHz. for a 100 cm. lens. In the preferred embodiment, available prism size becomes the practical limit.

EXAMPLE OF PREFERRED EMBODIMENT

A light deflection system utilizing the present invention can be constructed with a helium-neon laser light source emitting at 6328 A. A KDP isosceles triangular prism with an apex angle of 67°, and which is sufficiently large to pass a beam 3 cm. in diameter forms the deflector. Such a prism yields a maximum deflection angle of 0.1 minute in one pass with an applied electrical field of 10 kv./cm. The converting lens has a field angle of 1° and a focal length of 100 cm., and the linear dimension of the exit mirror of the image inverter (i.e. the length of the projection of mirror 22 on focal plane 40) is 1.173 cm. The system utilizing the above parameters yields 27 resolvable spots from 10 round trips of the light beam through the system. The upper limit for the deflection frequency is 7 mHz.

By substituting a carefully designed lens with about a 5° field for that in the above described system, a deflector achieving 100 resolvable spots and a 1 mHz. deflection rate is obtained using presently available KDP.

The embodiments of the invention in which an exclusive property or rights is claimed are defined as follows:

1. A light beam deflection system comprising:
   converting means arranged and constructed to convert an impinging diverging light path entering from one side thereof to a parallel light path and to convert an impinging parallel light path entering on the opposite side thereof to a converging light path;
   deflector means positioned to intercept an incident parallel light path from the converting means and to redirect the intercepted parallel light path back as a parallel light path to and through the converting means along a path different in angle from and substantially overlapping the incident parallel light path, and
   inverter means positioned to intercept the resulting converging light path of the redirected light path and to reflect the resulting converging light path as a diverging light path back through said converging means and deflector means in a repeating manner for a predetermined number of cycles to thereby produce cumulative deflection of a light beam.

2. The light beam deflection system of claim 1 wherein the deflector means is a piezoelectrically driven mirror.

3. A light beam deflection system comprising:
   converting means for converting an impinging diverging light path entering from one side thereof to a parallel path and for converting an impinging parallel path entering the opposite side thereof to a converging path;
   electro-optical means positioned to receive a parallel path from the converting means and to deflect the path an amount proportional to an applied field, the electro-optical means having a predetermined volume traversable by a light beam path in a single pass therethrough;
   reflective means positioned adjacent the electro-optical means to intercept the deflected parallel light path after a traversal through the electro-optical means and to redirect the intercepted path back to and through the converting means along a parallel light path different in angle from and substantially overlapping the incident parallel light path such that the light beam traverses through a volume of the electro-optical means substantially superimposed on the predetermined volume and is cumulatively deflected upon each traversal thereof;
   inverting means positioned to intercept the cumulatively deflected light path after the light beam traverses through the converting means and to redirect the resulting converging path as a diverging light path back through the converting means and electro-optical means in a repeating manner for a predetermined number of cycles to thereby produce cumulative deflection of a light beam, and
   means for applying a field to the electro-optical means so that cumulative deflection is achieved upon each of the light beam's predetermined number of traversals through the electro-optical means.

4. A light beam deflection system in accordance with claim 3 wherein the converting means is a lens.

5. A light beam deflection system in accordance with claim 3 wherein the inverting means is a pair of substantially perpendicular plane reflective surfaces joined along a common edge.

6. A light beam deflection system in accordance with claim 5 wherein the converting means is a lens having first and second focal planes spaced at first and second predetermined distances from the lens on opposite sides thereof;
   the inverting means is positioned so that the common edge lies in the first focal plane;
   the reflective means includes a substantially planar reflective surface and is positioned so that at least a portion of the planar reflective surface lies in the second focal plane; and
   the electro-optical means is positioned between the lens and the second focal plane.

7. A light deflection system according to claim 6 wherein the electro-optical means includes a prism of potassium dihydrogen phosphate having first and second substantially parallel isosceles triangular faces connected by third, fourth and fifth substantially planar faces, the triangular faces having an apex angle of about 67°, the prism having crystallographic X and Y directions each at an angle of about 45° with the base of each of the triangular first and second sides, and having a crystallographic Z direction perpendicular to the triangular sides, and the means for applying a field electrode means connected to the first and second sides and adapted to be connected to control signal means.

8. A light deflection system as defined in claim 5 including:
   light source means constructed and arranged to provide a light beam which diverges from a point on the common edge on the inverting means as it proceeds toward the converting means; and
   control signal means operatively coupled to the means for applying a field to the electro-optical means.

References Cited

UNITED STATES PATENTS

| | | | |
|---|---|---|---|
| 2,652,742 | 9/1953 | Walsh | 88—14 |
| 3,243,722 | 3/1966 | Billings | 331—94.5 |
| 3,290,619 | 12/1966 | Geusic et al. | 332—7.51 |
| 3,354,407 | 11/1967 | Howling | 331—94.5 |
| 3,365,678 | 1/1968 | Maurer | 331—94.5 |

RONALD L. WIBERT, Primary Examiner

P. K. GODWIN, Jr., Assistant Examiner

U.S. Cl. X.R.

350—285